(12) United States Patent
Song et al.

(10) Patent No.: US 12,722,110 B2
(45) Date of Patent: Sep. 1, 2026

(54) SYSTEM FOR REDUCING ATMOSPHERIC POLLUTION GENERATED IN PRINTING HOUSE, AND OPERATION METHOD THEREFOR

(71) Applicant: THE SEOUL INSTITUTE, Seoul (KR)

(72) Inventors: Min Young Song, Hanam-si (KR); Haejoon Chun, Seoul (KR)

(73) Assignee: THE SEOUL INSTITUTE, Seoul (KR)

( * ) Notice: Subject to any disclaimer, the term of this patent is extended or adjusted under 35 U.S.C. 154(b) by 293 days.

(21) Appl. No.: 18/719,369

(22) PCT Filed: Jun. 14, 2022

(86) PCT No.: PCT/KR2022/008365
§ 371 (c)(1),
(2) Date: Jun. 13, 2024

(87) PCT Pub. No.: WO2023/120838
PCT Pub. Date: Jun. 29, 2023

(65) Prior Publication Data

US 2025/0058264 A1 Feb. 20, 2025

(30) Foreign Application Priority Data

Dec. 23, 2021 (KR) ........................ 10-2021-0186247

(51) Int. Cl.
*B01D 53/02* (2006.01)
*B01D 46/00* (2022.01)
(Continued)

(52) U.S. Cl.
CPC ....... *B01D 46/442* (2013.01); *B01D 46/0047* (2013.01); *B01D 46/0086* (2013.01);
(Continued)

(58) Field of Classification Search
CPC ........................ B01D 2273/30; B01D 2279/45; B01D 46/00; B01D 46/0047; B01D 46/0086;
(Continued)

(56) References Cited

U.S. PATENT DOCUMENTS

2004/0147218 A1* 7/2004 Melotti ............... B41F 33/0018 454/236
2015/0360462 A1* 12/2015 Lowrance ............ B41J 11/0035 101/425
(Continued)

FOREIGN PATENT DOCUMENTS

JP 07-204433 A 8/1995
JP 11-090177 A 4/1999
(Continued)

*Primary Examiner* — Christopher P Jones
(74) *Attorney, Agent, or Firm* — NKL LAW; Jae Youn Kim

(57) ABSTRACT

The present invention provides a system for reducing atmospheric pollution generated in a printing facility, and an operation method therefor, the printing facility comprising a plurality of printing devices 10 comprising air purifying modules 11 and exhaust holes 12 connected to the modules.

10 Claims, 3 Drawing Sheets

(51) Int. Cl.
*B01D 46/44* (2006.01)
*B01D 46/46* (2006.01)
*B41F 35/00* (2006.01)
*F24F 8/108* (2021.01)

(52) U.S. Cl.
CPC ......... *B01D 46/0087* (2013.01); *B01D 46/46* (2013.01); *B41F 35/00* (2013.01); *F24F 8/108* (2021.01); *B01D 2273/30* (2013.01); *B01D 2279/45* (2013.01)

(58) Field of Classification Search
CPC .... B01D 46/0087; B01D 46/42; B01D 46/44; B01D 46/442; B01D 46/46; B41F 33/0018; B41F 35/00; B41P 2235/26; B41P 2235/27; B41P 2251/00; F24F 8/108
See application file for complete search history.

(56) References Cited

U.S. PATENT DOCUMENTS

| | | | | |
|---|---|---|---|---|
| 2016/0016423 | A1* | 1/2016 | Mauck ............... | B01D 46/0039 347/110 |
| 2017/0125270 | A1* | 5/2017 | Choi .................. | B01D 46/0045 |
| 2018/0224145 | A1* | 8/2018 | Tajima ..................... | F24F 11/81 |
| 2019/0301761 | A1* | 10/2019 | Scheja .................... | F24F 8/167 |

FOREIGN PATENT DOCUMENTS

| | | | |
|---|---|---|---|
| KR | 10-2003-0024670 | A | 3/2003 |
| KR | 10-2016-0102676 | A | 8/2016 |
| KR | 10-1731854 | B1 | 5/2017 |
| KR | 10-1867001 | B1 | 6/2018 |
| KR | 20190078328 | A | 7/2019 |
| KR | 10-2308883 | B1 | 10/2021 |

* cited by examiner

SYSTEM FOR REDUCING ATMOSPHERIC POLLUTION GENERATED IN PRINTING HOUSE, AND OPERATION METHOD THEREFOR

TECHNICAL FIELD

The present invention relates to environmental technology, and more specifically, to a system for reducing atmospheric pollution generated in a printing facility, and an operation method for the system.

BACKGROUND ART

A printing facility is a place to print lots of outputs using one or more printing devices. High-quality digital printing technologies using lasers or ultraviolet light have been developed, but they are not suitable for printing large volumes at once and are expensive. So, traditional ink-based offset and lithographic printing continue to be widely used.

For printing, printing devices emit considerable amounts of heat since paper must be rapidly rolled, and the emitted heat is in continuous contact with ink or paper, so the conventional printing devices generate various air pollutants. The air pollutants include particulate pollutants and gaseous pollutants. As the particulate pollutants, fine dust and others are discharged, and as the gaseous pollutants, volatile organic compounds (VOCs), nitrogen dioxide, ozone, and others are discharged, and the pollutants are emitted simultaneously. It was reported that the total VOCs emitted during printing are five times higher than the average atmospheric concentration.

The heat emitted from printing devices negatively affects the printing devices as electronic devices, so most of the printing devices adopt an air-cooling principle to expel internal air to the outside using a fan. However, the pollutants are widely spread inside the printing facility by the fan. Of course, to mitigate the spread of pollutants, some printing devices are equipped with air purifiers on an exhaust hole of the fan. However, most of the air purifiers equipped on the printing devices provide only filter net-level purification, and are insufficient for removing ultrafine particles and gaseous pollutants. Furthermore, it is difficult to intuitively determine whether the air purifiers have reached the end of their service life, leading to a significant number of the air purifiers failing to function effectively.

Due to such factors, the indoor air quality in most printing facilities remains poor. Many printing facilities have fans to expel exhaust gases from the printing devices outside, but it does not significantly improve indoor air quality. Moreover, if air inside the printing facility is expelled by the fan without being purified, the air around the printing facility is polluted. The atmospheric pollution by the printing facilities is particularly severe in areas where lots of printing facilities are concentrated, referred to as “printing street”.

FIG. 1 is a schematic diagram of a conventional printing facility. A printing device 10 includes an air purifying module 11 and an exhaust hole 12 connected to the air purifying module 11. An intake hole which communicates with a fan 30 is located near the printing device 10. A filter net may be located inside or outside the fan 30. However, such a printing facility structure cannot sufficiently purify the pollutants generated from the printing device. So, the printing facility structure poses risks to workers inside the printing facility and causes atmospheric pollution. If indoor air quality is poor, contaminated air is reintroduced into the printing device 10, and it cases device malfunctions and reduces the lifespan of the air purifying module 11.

Pollutants generated from the printing facility are mostly well-known, so various technological solutions to treat the pollutants can be considered. However, since the printing facilities have a wide variation in pollutant generation level according to work characteristics such as workload, working hours, and facility size, it is difficult to apply the technologies uniformly. In addition, as described above, the conventional printing devices have a problem in that particulate pollutants and gaseous pollutants are generated simultaneously. Since most printing facilities are small-scale, if equipment installation costs or operation costs are expensive, it is also difficult to apply the technologies.

(Patent Document 1) Korean Patent No. 10-2308883
(Patent Document 2) Korean Patent No. 10-1867001
(Patent Document 3) Korean Patent Publication No. 10-2019-0078328

DISCLOSURE

Technical Problem

The present invention was devised to address the aforementioned problems.

An objective of the present invention is to propose a technology that is specialized for the environment of a printing facility, and can improve indoor air quality within the printing facility and the quality of air expelled to the outside, thereby reducing atmospheric pollution.

Another objective of the present invention is to develop a technology that is specialized for the environment of a printing facility which discharges particulate pollutants and gaseous pollutants simultaneously, and can be applied to small-scale printing facilities at low operational costs by selecting the operation and necessary filters according to pollution concentration.

A further objective of the present invention is to prevent pollutants from entering an air purifying module of a printing device, thereby extending the lifespan of the air purifying module. Furthermore, if the air purifying module is significantly deteriorated in function, the present invention automatically alerts the functional deterioration, thereby preventing a continuous increase in pollution concentration due to malfunction of the air purifying module.

Technical Solution

To accomplish the above-mentioned objects, according to the present invention, there is provided a system for reducing atmospheric pollution occurring in a printing facility including a plurality of printing devices, each of which has an air purifying module and an exhaust hole connected to the air purifying module, and which are located in a printing area, the system including: a particulate pollutant processor communicating with an intake hole located at the exhaust hole, and connected to the intake hole through a first valve; a gaseous pollutant preprocessor connected to the particulate pollutant processor through a second valve; a high concentration processing filter unit and a low concentration processing filter unit connected to the gaseous pollutant preprocessor through a third valve; a fan connected to the high concentration processing filter unit and the low concentration processing filter unit, which converge; a first bypass passage connecting the second valve and the fan to bypass the gaseous pollutant preprocessor, the high concentration processing filter unit, and the low concentration processing filter unit; a second bypass passage connecting the first valve and the gaseous pollutant preprocessor to bypass the particulate pollutant processor; a first sensor located at each exhaust hole to measure particulate pollution concentration and gaseous pollution concentration, and control the valves; and a second sensor located outside the plurality of printing devices within the printing area to measure particulate pollution concentration and gaseous pollution concentration, and control the valves.

In another aspect of the present invention, there is provided a method for operating the system including: a step (a) of checking whether the printing device is operating; a step (b) of, if the printing device is operating, checking whether the particulate pollution concentration measured by the first sensor exceeds the particulate pollution standard and whether the gaseous pollution concentration measured by the first sensor exceeds the gaseous pollution standard; a step (c1) of, if the particulate pollution concentration measured by the first sensor exceeds the particulate pollution standard and the gaseous pollution concentration measured by the first sensor exceeds the gaseous pollution standard, operating the fan and controlling the first valve and the second valve so that the exhaust gas discharged from the printing device passes through the particulate pollutant processor and the gaseous pollutant preprocessor; a step (c2) of, if the particulate pollution concentration measured by the first sensor exceeds the particulate pollution standard and the gaseous pollution concentration measured by the first sensor is below the gaseous pollution standard, operating the fan and controlling the first valve and the second valve so that the exhaust gas discharged from the printing device passes through the particulate pollutant processor and then passes through the first bypass passage; a step (c3) of, if the particulate pollution concentration measured by the first sensor is below the particulate pollution standard and the gaseous pollution concentration measured by the first sensor exceeds the gaseous pollution standard, operating the fan and controlling the first valve and the second valve so that the exhaust gas discharged from the printing device passes through the second bypass passage and then passes through the gaseous pollutant preprocessor; and a step of, if the particulate pollution concentration measured by the first sensor is below the particulate pollution standard and the gaseous pollution concentration measured by the first sensor is below the gaseous pollution standard, stopping the fan.

Moreover, after the step (c4), the gaseous pollution standard is a low concentration gaseous pollution standard, the method further includes: a step (d1) of, if the gaseous pollution concentration measured by the first sensor exceeds the high concentration gaseous pollution standard, which is higher than the low concentration gaseous pollution standard, controlling the third valve so that the exhaust gas discharged from the printing device passes through the gaseous pollutant preprocessor and then passes through the high concentration processing filter unit; and a step (d2) of, if the gaseous pollution concentration measured by the first sensor is lower than the high concentration gaseous pollution standard, controlling the third valve so that the exhaust gas discharged from the printing device passes through the gaseous pollutant preprocessor and then passes through the low concentration processing filter unit.

Furthermore, before the step (a), the method includes: a step (01) of, if the particulate pollution concentration measured by the second sensor exceeds the particulate pollution standard or the gaseous pollution concentration measured by the second sensor exceeds the gaseous pollution standard, notifying the replacement of the air purifying module of the printing device by a warning unit, operating the fan, and controlling the first valve, the second valve, and the third valve so that the exhaust gas discharged from the printing device passes through the particulate pollutant processor, the gaseous pollutant preprocessor, and the high concentration processing filter unit. After the step (01), a control unit confirms an air purifying module replacement signal of the printing device, and then, the step (a) is progressed.

Additionally, before the step (a), the method includes: a step (11) in which the control unit 500 accumulates the particulate pollution concentration and the gaseous pollution concentration measured by the second sensor to calculate the total particulate pollution and the total gaseous pollution; and a step (12) of, if the total particulate pollution calculated by the control unit exceeds the predetermined total particulate pollution standard or if the total gaseous pollution calculated by the control unit exceeds the total gaseous pollution standard, notifying the replacement of the air purifying module of the printing device by a warning unit, operating the fan, and controlling the first valve, the second valve, and the third valve so that the exhaust gas discharged from the printing device passes through the particulate pollutant processor, the gaseous pollutant preprocessor, and the high concentration processing filter unit. After the step (12), the control unit confirms the air purifying module replacement signal of the printing device, and then, the step (a) is progressed.

In addition, the step (11) includes: a step in which the control unit checks the number of the printing devices; a step in which the control unit checks the amount of exhaust gas discharged per unit time from the exhaust hole of the printing devices; and a step in which the control unit calculates the total particulate pollution and total gaseous pollution using the unit time, the accumulated measurement time, the number of printing devices, the amount of exhaust gas discharged per unit time from the printing device, and multiple values of the particulate pollution concentration and the gaseous pollution concentration measured by the second sensor during the accumulated measurement time.

Moreover, after the step (c4), the air discharged through the fan is resupplied to the printing area, and the resupplied air is introduced into the printing device.

Furthermore, the printing facility includes a paper loading area, a third sensor for measuring the particulate pollution concentration is located in the paper loading area, and a paper intake hole is located in the paper loading area and is connected to the particulate pollutant processor. After the step (a), the method further includes: a step (e1) of, if the printing device is not operating, checking whether the particulate pollution concentration measured by the third sensor exceeds the particulate pollution standard; a step (e2) of, if the particulate pollution concentration measured by the third sensor exceeds the particulate pollution standard, operating the fan and controlling the first valve and the second valve so that the exhaust gas discharged from the printing device passes through the particulate pollutant processor and then passes through the first bypass passage; and a step (e3) of, if the particulate pollution concentration measured by the third sensor is below the particulate pollution standard, stopping the fan (300).

Additionally, the RPM of the fan is controlled in proportion to the particulate pollution concentration measured by the first sensor or the gaseous pollution concentration measured by the first sensor.

In addition, the warning unit outputs the particulate pollution concentration and gaseous pollution concentration using the particulate pollution concentration measured by the first sensor and the gaseous pollution concentration measured by the first sensor.

Advantageous Effect

According to the present invention, an atmospheric pollution reduction system and an operation method specialized for environments of printing facilities are provided.

Particulate pollutants and gaseous pollutants are removed simultaneously. In a case where only one of the substances is present in high concentration, the substances can be selectively removed, and if the concentration is so low that it is not necessary to remove the substances, the function can be temporarily paused to extend the lifespan. Accordingly, operational costs are reduced.

It is not easy to completely seal the intake hole and the exhaust hole even though the intake hole is located adjacent to the printing device. However, the present invention can detect the air quality leaking into the printing area in consideration of the above situation, and operate the equipment according to the detected results. That is, the present invention can indirectly check the lifespan of the air purifying module of the printing device utilizing such a mechanism and notify replacement or, in severe cases, notify evacuation. Specifically, as an indicator for the notification, not only the concentration of pollutants but also the total amount is considered, thereby enabling verification of the lifespan of the air purifying module over time.

The purified air is resupplied to the printing area, ensuring that relatively clean air flows into the printing device. Accordingly, the lifespan of the air purifying module is extended, and the air quality within the printing facility can be improved.

In the paper loading area, a significant amount of dust is caused not by the printing device but by paper itself. The system according to the present invention can also cope with such pollutants. For instance, even in the case that there are a few pollutants caused by the printing device but lots of pollutants are accumulated only in the paper loading area, appropriate facility operation is possible.

MODE FOR INVENTION

Figure 1:
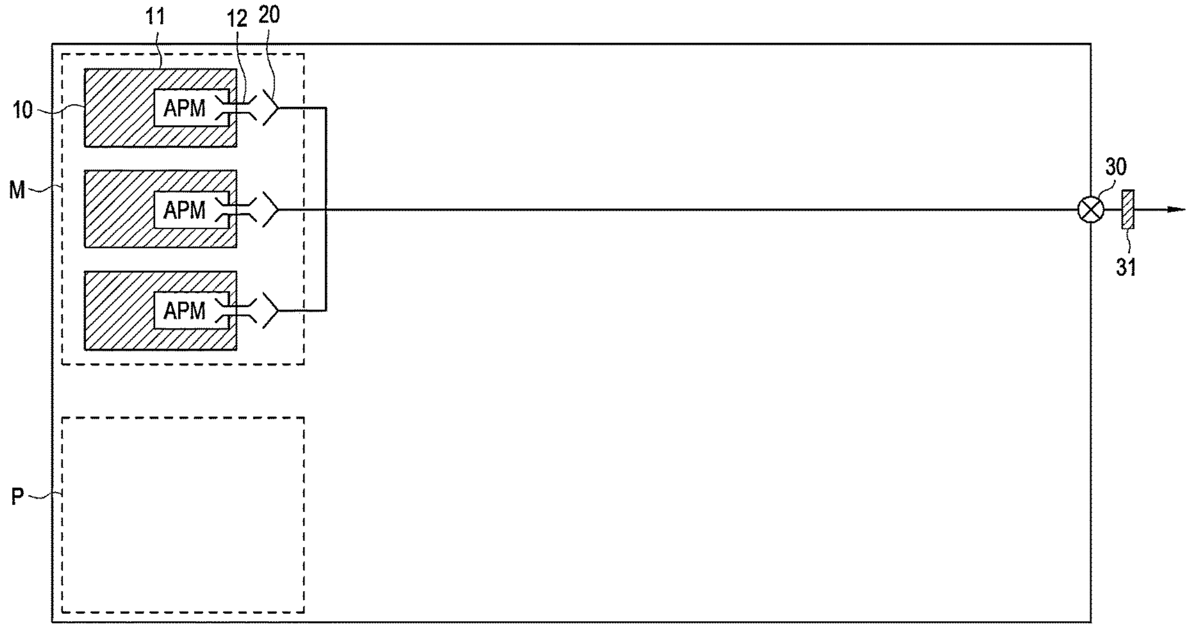
FIG. 1 is a conceptual diagram for depicting an exhaust gas flow in a conventional printing facility.
Figure 2:
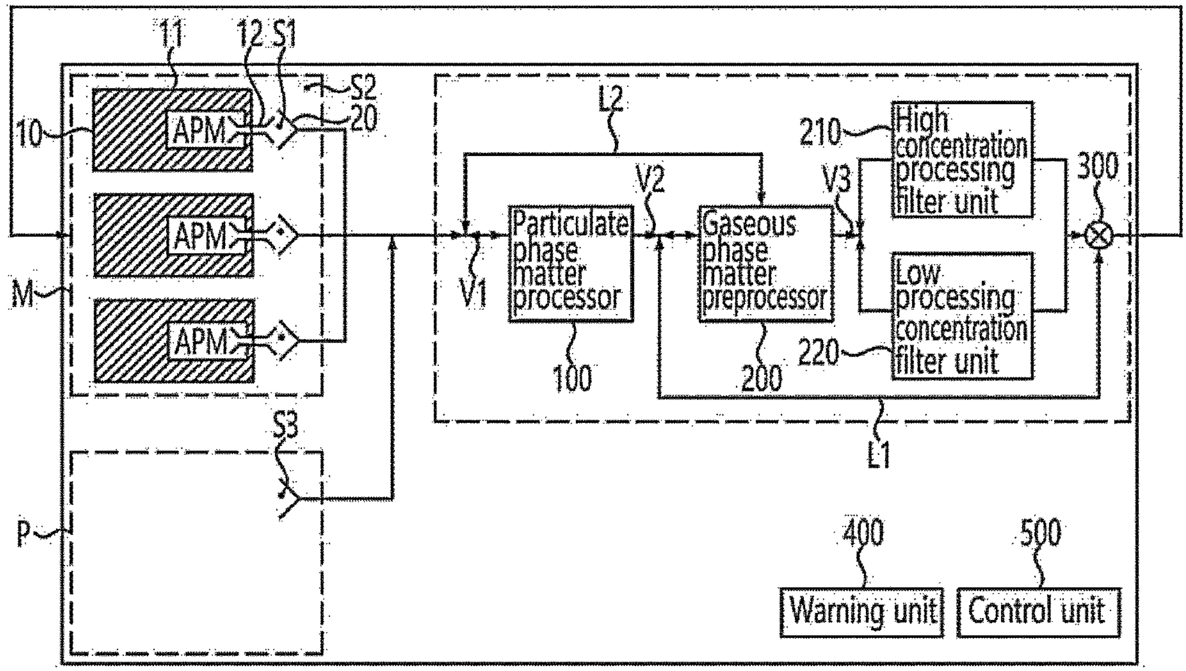
FIG. 2 is a conceptual diagram for depicting a system according to the present invention.
Figure 3:
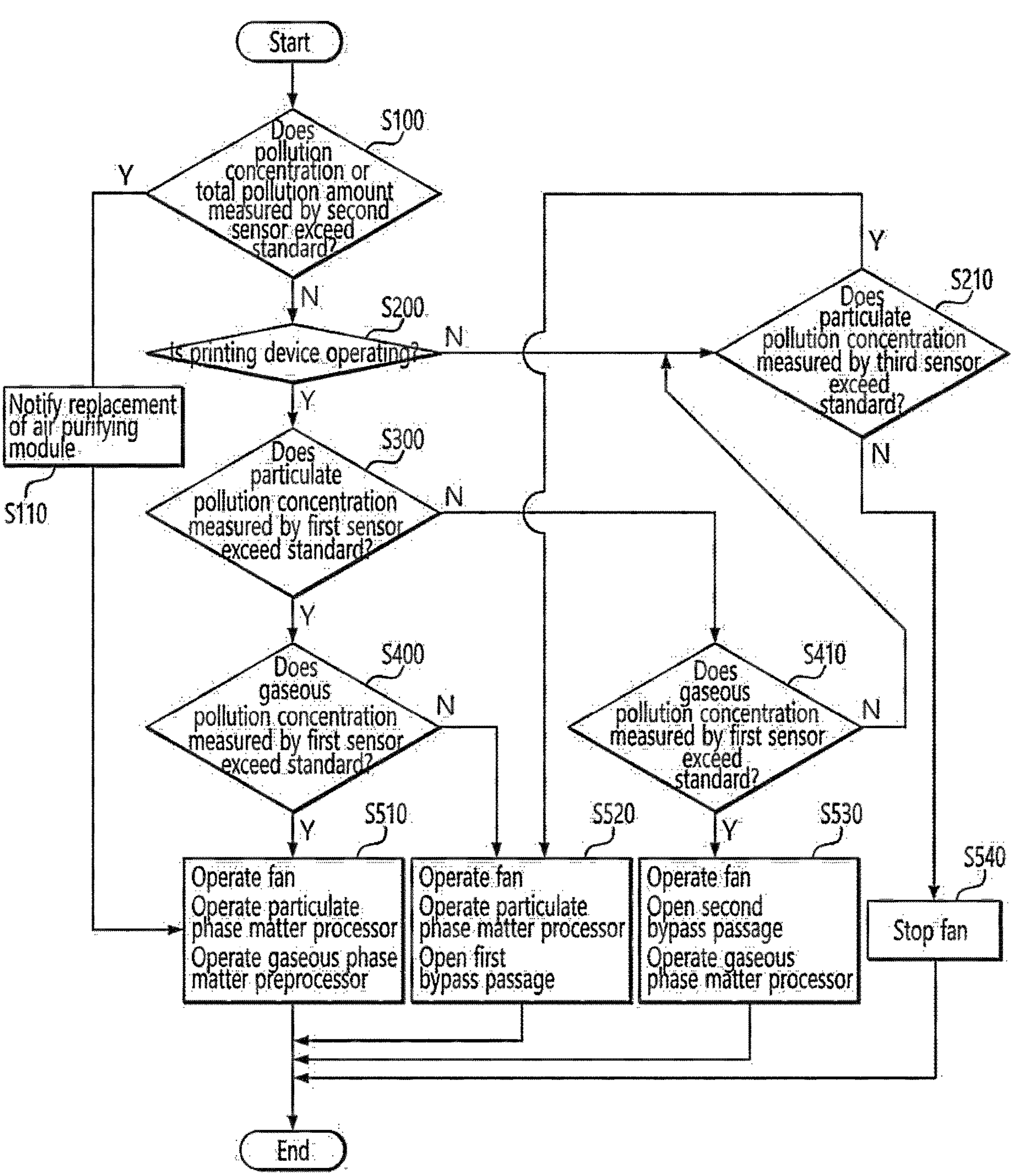
FIG. 3 is a flowchart for depicting a method according to the present invention.

Hereinafter, the present invention will be described with reference to the drawings.

Description of System

The system according to the present invention operates in a printing facility including a plurality of printing devices 10. The printing facility includes a printing area M where a plurality of printing devices 10 are located and a paper loading area P where paper is loaded. In most printing facilities, the printing devices 10 are grouped together in a designated place referred to as the printing area M, and for convenience of work, the paper loading area P is adjacent to the printing area M.

Here, the printing area M and the paper loading area P are not meant to be physically separated spaces by non-bearing walls or partitions. Depending on the environment of the printing facility, the printing area M and the paper loading area P can be distinguished in various ways.

The printing device 10 includes an air purifying module 11 and an exhaust hole 12 connected to the air purifying module 11.

An intake hole 20 is located adjacent to the exhaust hole 12. When a fan 300 operates, exhaust gas from the printing device 10 is introduced through the intake hole 20.

The exhaust hole 12 and the intake hole 20 are adjacent, but it is technically difficult to hermetically connect the exhaust hole 12 and the intake hole 20, and there is no need to be hermetically connected to each other.

A first sensor S1 is located between the exhaust hole 12 and the intake hole 20. The first sensor S1 measures particulate pollution concentration and gaseous pollution concentration. A measurement value of the first sensor S1 indicate the pollution level of the exhaust gas emitted from the printing device 10.

Within the printing area M, a second sensor S2 is located outside the printing device 10. Also, the second sensor S2 measures particulate pollution concentration and gaseous pollution concentration. A measurement value of the second sensor S2 indicates the overall pollution level of exhaust gas discharged from the plurality of printing devices 10. The second sensor does not indicate the overall indoor air quality inside the printing facility since being located in the printing area M. Therefore, if the printing device 10 is not operated but the measurement value of the second sensor S2 exceeds a specific threshold, the second sensor can estimate malfunctions of the air purifying modules 11 of the plurality of printing devices 10.

The first sensor S1 and the second sensor S2 may be an assembly of PM sensors and VOCs sensors to measure the particulate pollution concentration and the gaseous pollution concentration, but other combinations are possible. Additionally, valves V1, V2, and V3 are controlled based on the measurement values of the first sensor S1 and the second sensor S2.

In one embodiment of the present invention, the second sensor S2 may measure the total particulate pollution amount and the total gaseous pollution amount during a predetermined period. However, in this case, since the sensor assembly itself becomes larger and is more expensive, the second sensor S2 in another embodiment which will be described later can measure only the pollution concentration like the first sensor S1 and the total amount may be computed by the control unit 500. When the total particulate pollution amount and the total gaseous pollution amount are computed by the second sensor S2 or by computation, the valves V1, V2 and V3 are controlled or a warning unit 400 is operated using the computed values, thereby allowing for more accurate control and warnings.

In the paper loading area M, a paper intake hole communicating with a particulate pollutant processor 100, and a third sensor S3 is located. The third sensor S3 measures the particulate pollution concentration. It reflects that gas pollutants are unlikely to be generated solely by paper. The third sensor S3 may be a PM sensor, and the valves V1, V2 and V3, which will be described later, are controlled according to the measurement value.

The particulate pollutant processor 100 communicates with the intake hole 20, and is connected through the first valve V1. A gaseous pollutant preprocessor 200 communicates with the particulate pollutant processor 100 and is connected through the second valve V2. The particulate pollutant processor 100 can be any device designed to reduce particulate pollutants, and the gaseous pollutant preprocessor 200 can be any device capable of preprocessing gas pollutants before gaseous pollutants are treated by filters located at the rear end.

At the rear end of the gaseous pollutant preprocessor 200, a high concentration processing filter unit 210 and a low concentration processing filter unit 220 which are connected to each other to diverge through the third valve V3 are located.

The high concentration processing filter unit 210 and the low concentration processing filter unit 220 converge and are connected to the fan 300. RPM of the fan 300 can be controlled by the control unit 500. The RPM can be automatically controlled depending on the measurement values from the first sensor S1, the second sensor S2, and the third sensor S3.

Meanwhile, a first bypass passage L1, which connects the second valve V2 and the fan 300 to bypass the gaseous pollutant preprocessor 200, the high concentration processing filter unit 210, and the low concentration processing filter unit 220 is further included. By controlling the second valve V2, the exhaust gas passing through the particulate pollutant processor 100 can directly flow to the fan 300 through the first bypass passage L1.

Furthermore, a second bypass passage L2, which connects the first valve V1 and the gaseous pollutant preprocessor 200 to bypass the particulate pollutant processor 100 is further included. By controlling the first valve V1, the exhaust gas from the intake hole 20 can directly flow to the gaseous pollutant preprocessor 200.

A passage for resupplying the gas passing through the fan 300, namely, the purified gas back into the printing area M of the printing facility is also provided.

A warning unit 400 and a control unit 500 are further provided.

The warning unit 400 visually and/or audibly outputs the particulate pollution concentration and the gaseous pollution concentration measured by the first sensor S1. For example, by applying three levels of standard values, the warning unit can differentiate the pollution concentrations into caution, danger, and severe stages, and output different colors or sounds for each.

In an embodiment of the present invention, if the particulate pollution concentration and the gaseous pollution concentration measured by the second sensor S2 exceed a predetermined standard, it indicates that the overall indoor air quality of the printing facility has deteriorated due to faults of the air purifying module 11, the warning unit 400 can also output an evacuation stage in addition to the caution, danger, and severe stages.

The control unit 500 may be hardware having algorithms to control the valves V1, V2, and V3 based on the first sensor S1, the second sensor S2, and the third sensor S3, thereby automatically controlling the system according to the present invention. Additionally, through the control unit 500, the fan 300 can be manually controlled, and the RPM of the fan 300 can be automatically controlled using the measurement value from each sensor.

In an embodiment of the present invention, if the second sensor S2 only measures the particulate pollution concentration and the gaseous pollution concentration but does not measure the total amount of pollution concentrations, the control unit 500 can compute the total amount using it. For instance, the control unit 500 confirms the amount of exhaust gas per unit time discharged from the exhaust hole 11 of the printing device 10 to confirm the total exhaust gas amount per unit time, confirms the multiple values of the particulate pollution concentration and the gaseous pollution concentration measured by the second sensor S2 during the accumulated measurement time (the number of values being the accumulated measurement time divided by the unit time), and then, performs a rough calculation of the total amount using the values.

Description of Method

First, the values measured by the second sensor S2 must be confirmed (S100). If the particulate pollution concentration or the gaseous pollution concentration measured by the second sensor S2 exceeds a predetermined standard, it can be inferred that there are faults in the air purifying modules 11 of the plurality of printing devices 10, indicating that the indoor air quality is already poor. If the pollution concentration exceeds the standard, the warning unit 400 can warn of the need to replace the air purifying modules 11 and, if necessary, output the evacuation stage for workers (S110). In this case, for safety, the control unit 500 confirms a replacement signal for replacing the air purifying module 11 of the printing device 10, and then, proceeds to the next step.

In this case, along with the warning, the control unit must operate the system to improve the indoor air quality. Along with the warning, the control unit activates the fan 300, and controls the valves V1, V2, and V3 to ensure that the exhaust gases emitted from the printing device 10 pass through the particulate pollutant processor 100, the gaseous pollutant preprocessor 200, and the high concentration processing filter unit 210. The fan 300 operates at the highest RPM.

In an embodiment of the present invention, it is also possible to check whether the total particulate pollution and the total gaseous pollution measured by the second sensor S2 or calculated through the control unit 500 exceed the predetermined standard. Accordingly, it can be predicted that the current pollution concentrations measured by the second sensor S2 are not problematic but the indoor air quality will be soon deteriorated due to aging of the air purifying modules 11. So, a notification for the replacement of the air purifying modules 11 before the indoor air quality worsens further is provided pre-emptively.

If the measurement values from the second sensor S2 are all below the standard indicating that the overall indoor air quality is not problematic, the method according to the present invention is performed, and first, the operation of the printing devices 10 is checked (S200).

If the printing device 10 is not operating, by determining whether the particulate pollution concentration measured by the third sensor S3 exceeds the standard, it is confirmed that the particulate pollution is not caused by the printing device 10, and the degree of particulate pollution in the paper loading area P caused by the paper is confirmed. If there is no problem, the fan 300 is not operated (S540), and the printing device 10 is also not operated since the indoor air quality in both the printing area M and the paper loading area P is good.

If the printing device 10 is operating, the valves V1, V2, and V3 and the fan 300 are controlled using the particulate pollution concentration and the gaseous pollution concentration measured by the first sensor S1 (S300, S400).

Specifically, if the particulate pollution concentration measured by the first sensor S1 exceeds the particulate pollution standard and the gaseous pollution concentration measured by the first sensor S1 exceeds the gaseous pollution standard, the fan 300 is operated, and the first valve V1 and the second valve V2 are controlled such that the exhaust gas discharged from the printing device 10 passes through the particulate pollutant processor 100 and the gaseous pollutant preprocessor 200 (S510). The first bypass passage L1 and the second bypass passage L2 are not used.

If there are multiple printing devices 10, the system can be configured to operate if any one of the measurement values from the multiple first sensors S1 exceeds the standard. For a printing facility using more than ten printing devices 10, the minimum standard could be set based on the measurement values from two or more first sensors S1, and such standards can vary depending on the printing facility environment.

The exhaust gas discharged through the intake hole 12 of the printing device 10 can flow to the intake hole 12 by the fan inside the printing device 10, but when the fan 300 operates, the exhaust gas flows more towards the intake hole 12 due to the force.

The gaseous pollution standard is a low concentration gaseous pollution standard. A high concentration gaseous pollution standard is also set. The low concentration gaseous pollution standard and the and high concentration gaseous pollution standard can vary depending on the type of gas substances and sensors.

If the gaseous pollution concentration measured by the first sensor S1 exceeds the high concentration gaseous pollution standard, the third valve V3 is controlled so that the exhaust gas passes through the gaseous pollutant preprocessor 200 and then passes through the high concentration processing filter unit 210. If the measured gaseous pollution concentration is below the high concentration gaseous pollution standard, the third valve V3 is controlled so that the exhaust gas passes through the low concentration processing filter unit 220.

By distinguishing filters to use according to the gaseous pollution concentration, it is possible to prevent the shortening of the lifespan of high-performance high concentration treatment filters.

The exhaust gas of which the particulate pollutants and the gas substances have been processed while passing through the high concentration processing filter unit 210 or the low concentration processing filter unit 220 is discharged through the fan 300. The air discharged through the fan 300 can become external air, but can be resupplied to the printing area M so as to flow into the printing device 10, thereby helping extend the lifespan of the air purifying module 11 of the printing device 10 and aiding the operational durability of the printing device 10.

Meanwhile, if the particulate pollution concentration measured by the first sensor S1 exceeds the particulate pollution standard and the gaseous pollution concentration measured by the first sensor S1 is below the gaseous pollution standard, i.e., only particulate pollutants are detected, the fan 300 is operated, and the first valve V1 and the second valve V2 are controlled so that the exhaust gas discharged from the printing device 10 passes through the particulate pollutant processor 100 and then passes through the first bypass passage L1 (S520). The exhaust then reaches the fan 300 via the first bypass passage L1, and then, the next process follows as described above.

If the particulate pollution concentration measured by the first sensor S1 is below the particulate pollution standard and the gaseous pollution concentration measured by the first sensor S1 exceeds the gaseous pollution standard, i.e., only gaseous pollutants are detected, the fan 300 is operated, and the first valve V1 and the second valve V2 are controlled so that the exhaust gas discharged from the printing device 10 passes through the second bypass passage L2 and then passes through the gaseous pollutant preprocessor 200 (S530). Subsequently, the third valve V3 is controlled as previously described so that the exhaust gas passes through the high concentration processing filter unit 210 or the low concentration processing filter unit 220 to reach the fan 300.

If the particulate pollution concentration measured by the first sensor S1 is below the particulate pollution standard and the gaseous pollution concentration measured by the first sensor S1 is also below the gaseous pollution standard, i.e., neither particulate pollutants nor gaseous pollutants are detected, it is preferable to stop the fan 300 (S540). In some cases, the fan 300 may operate at a relatively low RPM to assist the flow of the exhaust gas discharged through the exhaust hole 12 of the printing device 10 into the intake hole 20.

In any case, in the steps (S510, S520, and S530) of operating the fan 300, it is preferable for the RPM of the fan 300 to be controlled in proportion to the particulate pollution concentration or the gaseous pollution concentration measured by the first sensor S1. That is, it is preferable for the fan 300 to operate at a higher RPM in higher pollution concentrations.

Meanwhile, the system can be controlled using the third sensor S3 located in the paper loading area P.

If the printing device 10 is not operating, or if the particulate pollution concentration measured by the third sensor S3 exceeds the particulate pollution standard (S210), the fan 300 operates. That is, if the particulate pollution concentration measured by the third sensor S3 exceeds the particulate pollution standard, the fan 300 is operated, and the first valve V1 and the second valve V2 are controlled so that the exhaust gas discharged from the printing device 10 passes through the particulate pollutant processor 100 and then passes through the first bypass passage L1 (S520).

In an embodiment of the invention, even if the printing device 10 is operating but the particulate pollutants and the gaseous pollutants are all below the standards, the particulate pollution concentration measured by the third sensor S3 is checked, and then, if the measured particulate pollution concentration is higher than the particulate pollution standard, the step S520 may be performed.

SEQUENCE LIST TEXT

- 10: printing device
- 11: air purifying module (APM)
- 12: exhaust hole
- 20: intake hole
- 30: fan
- 31: filter net
- 100: particulate pollutant processor
- 200: gaseous pollutant preprocessor
- 210: high concentration processing filter unit
- 220: low concentration processing filter unit
- 300: fan
- S1: first sensor
- S2: second sensor
- S3: third sensor
- V1: first valve
- V2: second valve
- V3: third valve
- L1: first bypass passage
- L2: second bypass passage
- M: printing area
- P: paper loading area

The invention claimed is:

1. A system for reducing atmospheric pollution occurring in a printing facility including a plurality of printing devices, each of which has an air purifying module and an exhaust hole connected to the air purifying module, and which are located in a printing area, the system comprising:
- a particulate pollutant processor communicating with intake holes located at each exhaust hole, and connected to the intake holes through a first valve;
- a gaseous pollutant preprocessor connected to the particulate pollutant processor through a second valve;
- a high concentration processing filter unit and a low concentration processing filter unit connected to the gaseous pollutant preprocessor through a third valve;
- a fan connected to the high concentration processing filter unit and the low concentration processing filter unit, which converge;
- a first bypass passage connecting the second valve and the fan to bypass the gaseous pollutant preprocessor, the high concentration processing filter unit, and the low concentration processing filter unit;
- a second bypass passage connecting the first valve and the gaseous pollutant preprocessor to bypass the particulate pollutant processor;
- a first sensor located at each exhaust hole to measure particulate pollution concentration and gaseous pollution concentration, and control the first valve, the second valve, and the third valve; and
- a second sensor located outside the plurality of printing devices within the printing area to measure particulate pollution concentration and gaseous pollution concentration, and control the first valve, the second valve, and the third valve.

2. A method for operating the system according to claim 1, comprising:
- a step (a) of checking whether the printing devices are operating;
- a step (b) of, if the printing devices are operating, checking whether the particulate pollution concentration measured by the first sensor exceeds a particulate pollution standard and whether the gaseous pollution concentration measured by the first sensor exceeds a gaseous pollution standard;
- a step (c1) of, if the particulate pollution concentration measured by the first sensor exceeds the particulate pollution standard and the gaseous pollution concentration measured by the first sensor exceeds the gaseous pollution standard, operating the fan and controlling the first valve and the second valve so that an exhaust gas discharged from the printing devices passes through the particulate pollutant processor and the gaseous pollutant preprocessor;
- a step (c2) of, if the particulate pollution concentration measured by the first sensor exceeds the particulate pollution standard and the gaseous pollution concentration measured by the first sensor is below the gaseous pollution standard, operating the fan and controlling the first valve and the second valve so that the exhaust gas discharged from the printing devices passes through the particulate pollutant processor and then passes through the first bypass passage;
- a step (c3) of, if the particulate pollution concentration measured by the first sensor is below the particulate pollution standard and the gaseous pollution concentration measured by the first sensor exceeds the gaseous pollution standard, operating the fan and controlling the first valve and the second valve so that the exhaust gas discharged from the printing devices passes through the second bypass passage and then passes through the gaseous pollutant preprocessor; and
- a step of, if the particulate pollution concentration measured by the first sensor is below the particulate pollution standard and the gaseous pollution concentration measured by the first sensor is below the gaseous pollution standard, stopping the fan.

3. The method according to claim 2, wherein after the step (c4), the gaseous pollution standard is a low concentration gaseous pollution standard, the method further comprising:
- a step (d1) of, if the gaseous pollution concentration measured by the first sensor exceeds a high concentration gaseous pollution standard, which is higher than the low concentration gaseous pollution standard, controlling the third valve so that the exhaust gas discharged from the printing devices passes through the gaseous pollutant preprocessor and then passes through the high concentration processing filter unit; and
- a step (d2) of, if the gaseous pollution concentration measured by the first sensor is lower than the high concentration gaseous pollution standard, controlling the third valve so that the exhaust gas discharged from the printing devices passes through the gaseous pollutant preprocessor and then passes through the low concentration processing filter unit.

4. The method according to claim 2, before the step (a), comprising:
- a step (01) of, if the particulate pollution concentration measured by the second sensor exceeds the particulate pollution standard or the gaseous pollution concentration measured by the second sensor exceeds the gaseous pollution standard, notifying a replacement of the air purifying modules of the devices by a warning unit, operating the fan, and controlling the first valve, the second valve, and the third valve so that the exhaust gas discharged from the printing devices passes through the particulate pollutant processor, the gaseous pollutant preprocessor, and the high concentration processing filter unit,
- wherein after the step (01), a control unit confirms an air purifying module replacement signal of the printing devices, and then, the step (a) is progressed.

5. The method according to claim 2, before the step (a), comprising:
- a step (11) in which a control unit accumulates the particulate pollution concentration and the gaseous pollution concentration measured by the second sensor to calculate a total particulate pollution and a total gaseous pollution; and
- a step (12) of, if the total particulate pollution calculated by the control unit exceeds a predetermined total particulate pollution standard or if the total gaseous pollution calculated by the control unit exceeds a total gaseous pollution standard, notifying a replacement of the air purifying modules of the printing devices by a warning unit, operating the fan, and controlling the first valve, the second valve, and the third valve so that the exhaust gas discharged from the printing devices passes through the particulate pollutant processor, the gaseous pollutant preprocessor, and the high concentration processing filter unit,
- wherein after the step, the control unit confirms the air purifying module replacement signal of the printing devices, and then, the step (a) is progressed.

6. The method according to claim 5, wherein the step (11) comprises:

a step in which the control unit checks the number of the printing devices;

a step in which the control unit checks the amount of exhaust gas discharged per unit time from the exhaust holes of the printing devices; and a step in which the control unit calculates the total particulate pollution and total gaseous pollution using the unit time, an accumulated measurement time, the number of printing devices, the amount of exhaust gas discharged per unit time from the printing devices, and multiple values of the particulate pollution concentration and the gaseous pollution concentration measured by the second sensor during the accumulated measurement time.

7. The method according to claim 2, wherein after the step (c4), the air discharged through the fan is resupplied to the printing area (M), and the resupplied air is introduced into the printing devices.

8. The method according to claim 2, wherein the printing facility includes a paper loading area (P), a third sensor for measuring a particulate pollution concentration is located in the paper loading area, and a paper intake hole is located in the paper loading area and is connected to the particulate pollutant processor, and wherein after the step (a), the method further comprises:

a step (e1) of, if the printing devices are not operating, checking whether the particulate pollution concentration measured by the third sensor exceeds the particulate pollution standard;

a step (e2) of, if the particulate pollution concentration measured by the third sensor exceeds the particulate pollution standard, operating the fan and controlling the first valve and the second valve so that the exhaust gas discharged from the printing devices passes through the particulate pollutant processor and then passes through the first bypass passage; and a step (e3) of, if the particulate pollution concentration measured by the third sensor is below the particulate pollution standard, stopping the fan.

9. The method according to claim 2, wherein the RPM of the fan is controlled in proportion to the particulate pollution concentration measured by the first sensor or the gaseous pollution concentration measured by the first sensor.

10. The method according to claim 2, wherein a warning unit outputs the particulate pollution concentration and the gaseous pollution concentration using the particulate pollution concentration measured by the first sensor and the gaseous pollution concentration measured by the first sensor.

* * * * *